(12) United States Patent
Maida, Jr. et al.

(10) Patent No.: US 6,188,645 B1
(45) Date of Patent: Feb. 13, 2001

(54) SEISMIC SENSOR ARRAY WITH ELECTRICAL-TO OPTICAL TRANSFORMERS

(75) Inventors: John L. Maida, Jr., Houston; John Luscombe, Sugarland; Gary J. Craig, Houston, all of TX (US); Louis W. Erath, Abbeville, LA (US)

(73) Assignee: Geosensor Corporation, Houston, TX (US)

(*) Notice: Under 35 U.S.C. 154(b), the term of this patent shall be extended for 0 days.

(21) Appl. No.: 09/419,199

(22) Filed: Oct. 15, 1999

Related U.S. Application Data

(63) Continuation-in-part of application No. 09/330,584, filed on Jun. 11, 1999.

(51) Int. Cl.⁷ .................................................. H04B 11/00
(52) U.S. Cl. ............................................ 367/151; 367/149
(58) Field of Search .............................. 702/14; 367/149, 367/25, 151; 356/345; 385/12

(56) References Cited

U.S. PATENT DOCUMENTS

| | | | |
|---|---|---|---|
| 4,751,690 * | 6/1988 | Krueger | 367/149 |
| 4,866,683 * | 9/1989 | Phillips | 367/157 |
| 4,951,271 * | 8/1990 | Garrett et al. | 367/141 |
| 5,313,266 * | 5/1994 | Keolian et al. | 356/345 |
| 5,493,623 * | 2/1996 | Frische et al. | 385/12 |
| 5,877,999 * | 3/1999 | Holt et al. | 367/151 |

* cited by examiner

Primary Examiner—Christine K. Oda
Assistant Examiner—Victor J. Taylor
(74) Attorney, Agent, or Firm—Felsman, Bradley, Vaden, Gunter & Dillon, LLP

(57) ABSTRACT

A seismic sensor array includes a means for passive electrical to optical energy transformation and transmission. This transformation is used remotely with traditional sensor arrays, which may include hydrophones, geophones, or a combination of them. The transformation means is used to develop an optical signal in a fiber which then conveys the seismic signals to a recording center or data accumulator. The transformation means preferably comprises a stack of piezoelectric elements capped on each end by a rounded crown to accommodate an optical fiber wound around the stack and the crowns.

16 Claims, 3 Drawing Sheets

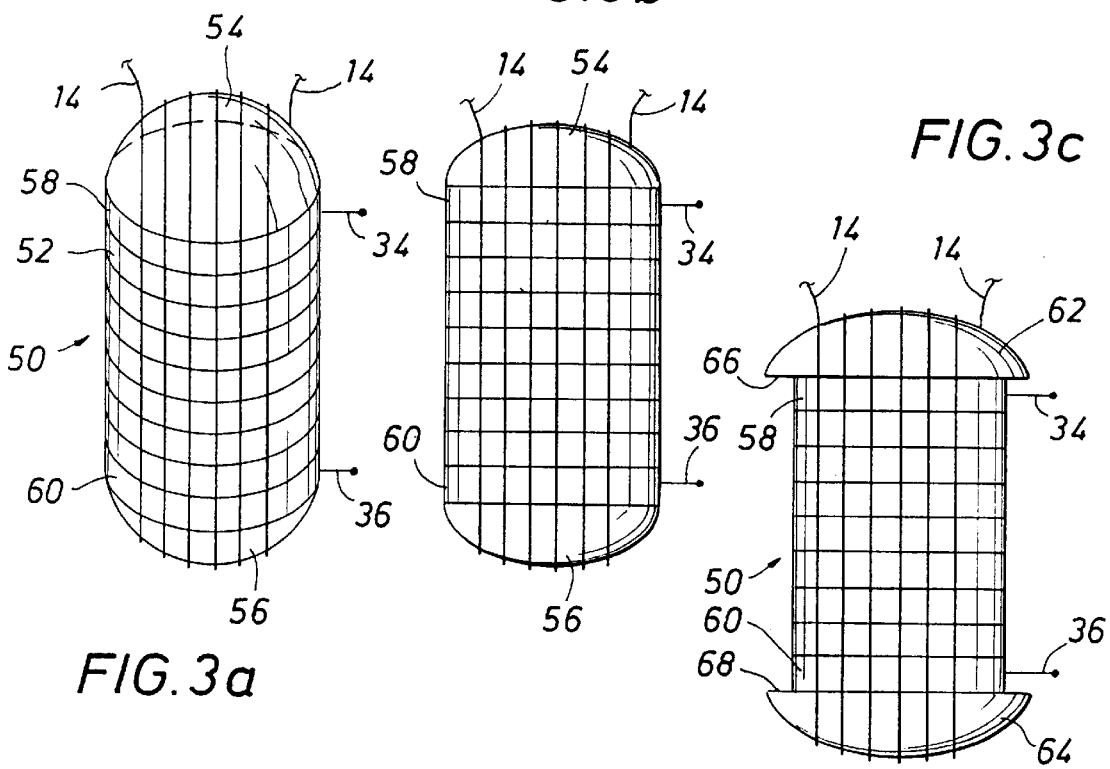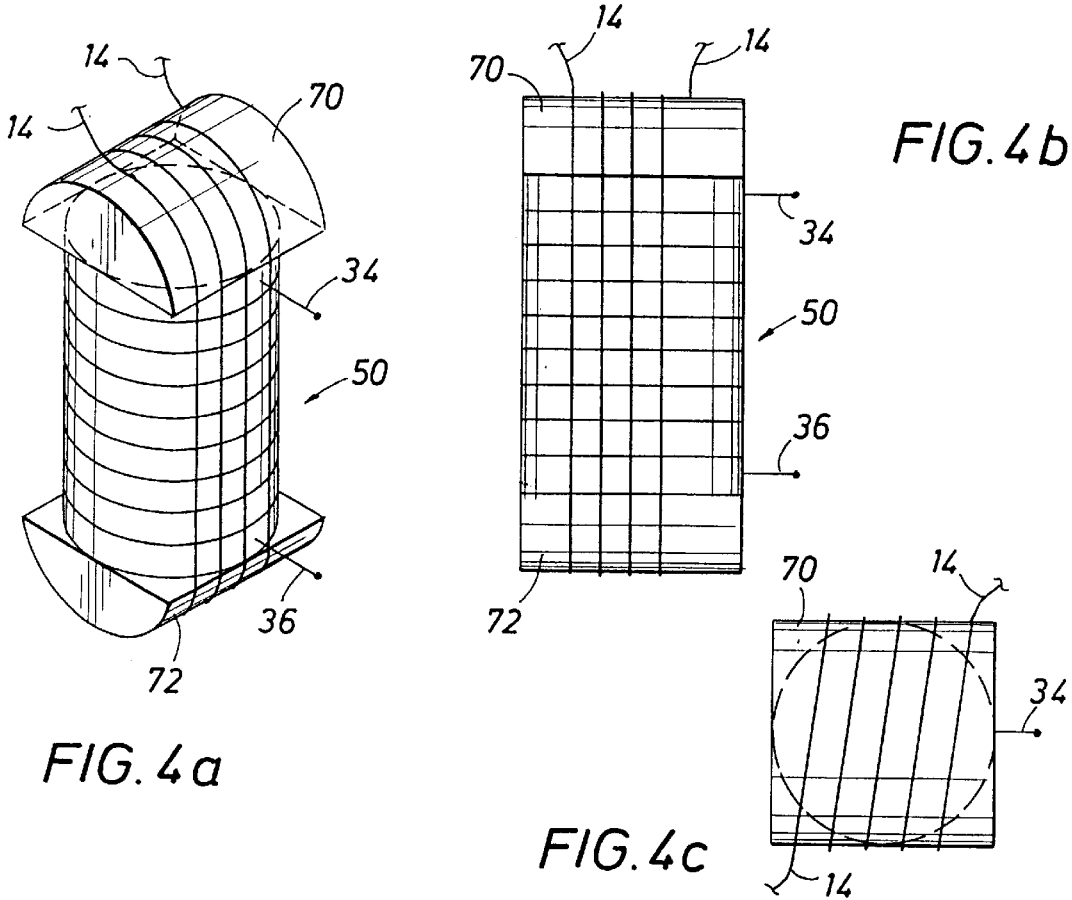

SEISMIC SENSOR ARRAY WITH ELECTRICAL-TO OPTICAL TRANSFORMERS

This is a continuation in part of co-pending application Ser. No. 09/330,584 filed Jun. 11, 1999 and assigned to the same assignee as the present invention.

FIELD OF THE INVENTION

The present invention relates generally to the field of seismic sensor arrays and, more particularly, to a hydrophone or geophone sensor array that receives an acoustic signal, develops an electrical signal representative of the acoustic signal, and, through a plurality of electrical-to-optical transformers, converts the electrical signal to an optical signal for transmission to a central receiver.

BACKGROUND OF THE INVENTION

In seismic exploration, whether on land, at sea, or in a transition zone, large numbers of sensors are coupled together in groups to receive an acoustic signal and send a signal to a central receiver for detection. This signal is representative of geological structures which are analyzed for the likelihood of bearing hydrocarbons.

The presentation of such geological structures with adequate clarity and resolution requires large quantities of data. This data must be acquired over a long seismic cable or marine seismic streamer and conducted back to the central receiver. Current systems use optical fibers to carry the vast quantities of data due to the relatively large bandwidth of fiber optics and their relative immunity to many kinds of electromagnetic interference.

One of the weak links in the system just described is the portion which senses the acoustic signal and develops a signal for transmission to the central receiver. Recent developments have focused on fiber-optic sensors, so that the acoustic signal itself is used as the modulation means, creating a time varying effect on the optical path length of an optical fiber under the influence of the acoustic signal. These systems have proved to be effective, but technical developments remain before they reach large scale manufacture. In the meantime, there remains a need for some means to use the electrical signal from a conventional sensor, such as a hydrophone or a geophone, which may be a single or multiple axis geophone, or a combination hydrophone and a plurality of geophones, and convert that electrical signal into a useful optical signal for transmission to the central receiver and/or a recording medium.

SUMMARY OF THE INVENTION

The present invention addresses this need in the art by providing a means for passive electrical to optical energy transformation and transmission. This transformation is used remotely with traditional sensor arrays, which may include hydrophones, geophones, or a combination of them. The transformation means is used to develop an optical signal in a fiber which then conveys the seismic signals via a signal conditioner to a recording center or data accumulator.

In one aspect of the present invention, the system, including an optical fiber, a source, and a receiver, passively and remotely interrogates a plurality of electrical sensor strings by the use of electrical to fiber optical energy transformers, which are located at spatial nodes along a fiber optic transmission bus. Each node may constitute one seismic data channel.

The present invention is particularly adapted for use with network arrays and architectures of traditional seismic sensors. Any of the known configurations of sensor strings may be passively and remotely interrogated with this invention.

A feature the invention is the electrical to fiber optical transformer. This transformer is a device that converts electrical energy to mechanical energy that in turn modulates the amplitude and/or phase of optical energy traveling within an optical fiber wave guide bus cable. This cable may have only optical fibers, a strength member and a protective outer jacketing with discretely placed nodal takeouts where the optical fiber is tapped into.

In a preferred embodiment, mechanical strain of a single mode fiber waveguide modulates the phase of a propagating light wave within the fiber core and/or cladding at each node. In optical fiber technology, single mode fiber is optical fiber that is designed for the transmission of a single ray or mode of light as a carrier and is used for long-distance signal transmission. This modulation takes place with respect to a reference leg or compensating section of a fiber optic interferometer. Various forms of channel multiplexing on a given fiber bus may be employed. These multiplexing methods may include the domains of time, wavelength, frequency, phase, coherence, polarization, etc. In other embodiments, a multimode fiber may be employed.

In operation, a conventional electrical sensor array is deployed in the traditional fashion with each seismic channel (typically a plurality or string of such electrical phones) electrically connected to its respective transformation node along the fiber optic bus line. In this embodiment, no remote electrical power source, data concentration boxes, analog-to-digital converters, heavy copper transmission cable, or other remote data acquisition components are required. This approach provides for totally electrically passive remote interrogation of the seismic sensor array via low-cost, lightweight, all-dielectric optical fiber cable and other ancillary state-of-the-art optical narrow/broadband sources, receivers, couplers, connectors, switches, filters, gratings, isolators, circulators, reflectors, and modulators.

These and other features of this invention will be apparent to those skilled in the art from a review of the following detailed description.

BRIEF DESCRIPTION OF THE DRAWINGS

FIG. 3a is a perspective view of an electrical to optical transformer comprising a stack of piezoelectric disks covered at each end by a dome shaped crown and wound with an optical fiber.

FIG. 3b is a side view of the transformer of FIG. 3a.

FIG. 3c is a side view of an electrical to optical transformer comprising a stack of piezoelectric disks covered at each end by a dome shaped crown in which the crown has a diameter greater than the diameter of the stack.

FIG. 4a is a perspective view of an electrical to optical transformer comprising a stack of piezoelectric disks covered at each end by a crown comprising a truncated cylinder.

FIG. 4b is a side view of the transformer of FIG. 4a.

FIG. 4c is a top view of the transformer of FIG. 4a.

DETAILED DESCRIPTION OF A PREFERRED EMBODIMENT

Figure 1:
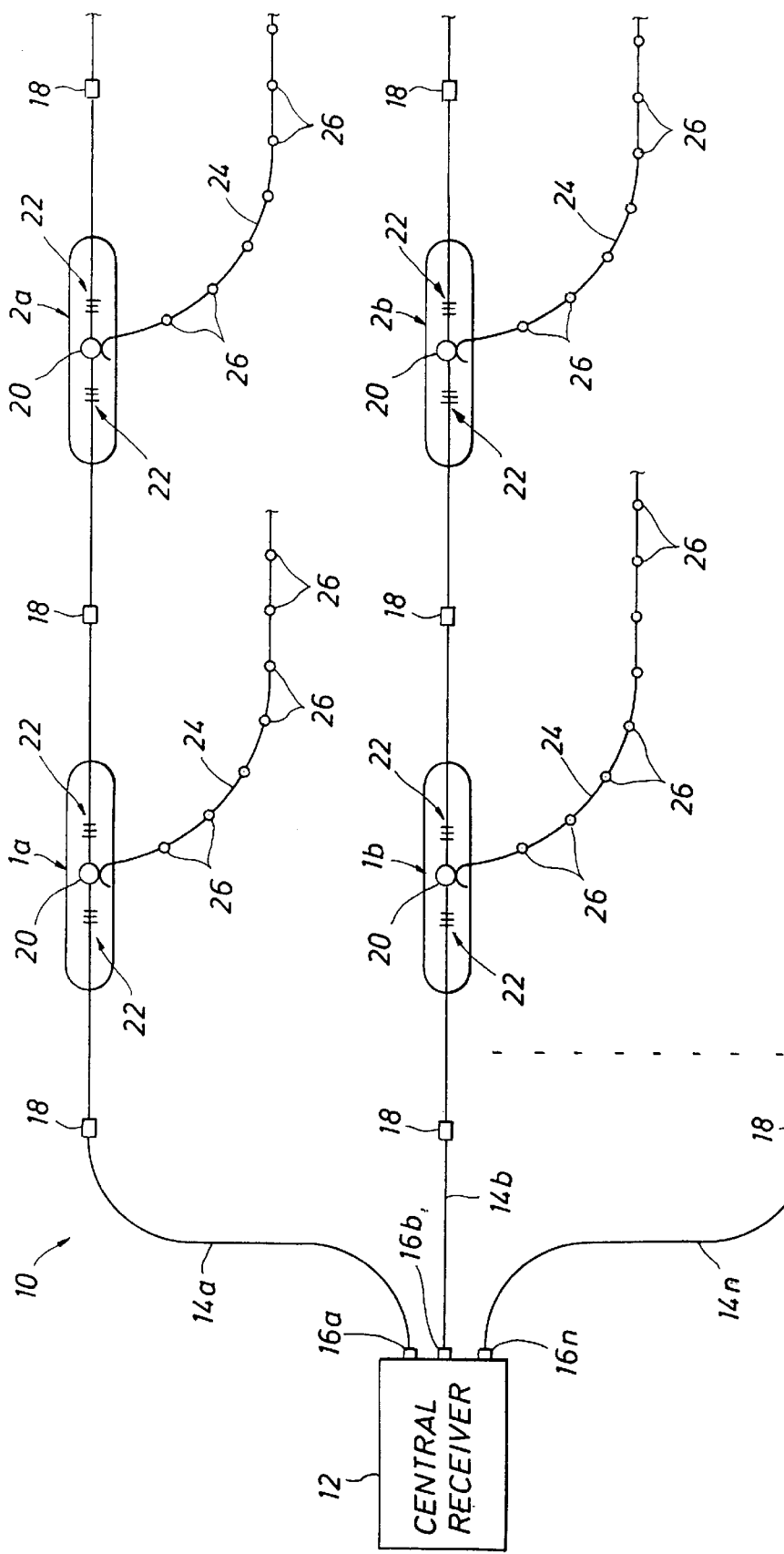
FIG. 1 is an overall schematic diagram of a system of the present invention which employs electrical to optical transformers in a seismic exploration system.

FIG. 1 is an overall schematic diagram of a seismic array 10 in which the present invention finds useful application.

Such an array may be included in a land system, a marine system, or a transition zone system. The system includes a central receiver 12 of the conventional type to receive and record seismic signals from a plurality of optical data transmission fibers 14a, 14b, through 14n. Any number of fibers may be used, limited only by the capacity of the central receiver to process the data streaming in. Each of the transmission fibers 14a, 14b, through 14n is preferably a single mode fiber and is coupled to the central receiver 12 through an optical fiber connector 16a, 16b, through 16n, respectively.

The optical fibers, which in operation carry the seismic data to the central receiver, are divided into sections, typically of about 400 meters in length in a marine application, by optical fiber connectors 18. On the transmission fiber 14a, and between respective ones of the connectors 18, are a set of nodes 1a, 2a, and so on for as many sections of fiber as are included in the system. Similarly, on the fiber 14b are a set of nodes 1b, 2b, and so on. At each node is an electrical to optical transformer 20, described below with regard to FIGS. 2a through 2d, 3a through 3c, and 4a through 4c. Either side of the transformer is a pair of reflectors or reflector/filter pairs 22, which may be fiber optic Bragg gratings, partial silver mirrors, or other appropriate means for channelization and multiplexing of the light signal in the transmission fiber.

Coupled at each of the nodes is a sensor string 24 which includes a plurality of sensors 26. The sensors may be geophones or hydrophones, or other phones, any of which can detect a seismic signal as a time varying pressure, position, velocity, acceleration, or other physical parameter. The sensors 26 develop an electrical signal that is representative of the seismic signal such as by piezoelectric elements, thus requiring no external energy source. This electrical signal is conducted through the string 24 to a transformer, where the electrical signal creates a time varying alteration in the optical path length within the data transmission fibers.

Figure 2A:
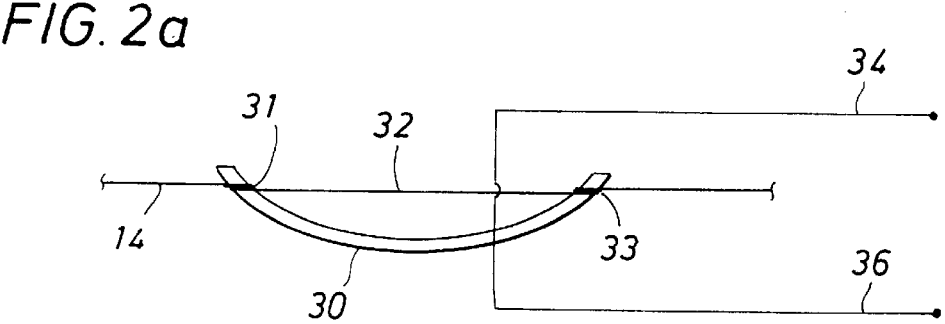
FIGS. 2a, 2b, 2c, and 2d are schematic diagrams of preferred embodiments of an electrical to optical transformer.

FIGS. 2a, 2b, 2c, and 2d depict schematic diagrams of electrical to optical transformers of this invention. In FIG. 2a, a transmission fiber 14 is held under tension by a piezoelectric driver 30. The driver 30 is preferably formed as described in U.S. Pat. No. 5,632,841 and is available from FACE International Corporation, Norfolk, Va., under the trade name THUNDER. When impressed with an electrical signal, the driver 30 exhibits significant flexure, thereby altering the optical path length of a section 32 of the fiber between points 31 and 33 of the fiber joined to the driver. In this embodiment, the driver 30 is coupled to a set of electrical leads 34 and 36 which are the conductors of the sensor string 24. The driver 30 is included within the transformer 20 at each node, and thus transforms the electrical signal from the sensors 26 to an optical signal in the transmission fiber 14, such as fibers 14a, 14b, through 14n.

Figure 2B:
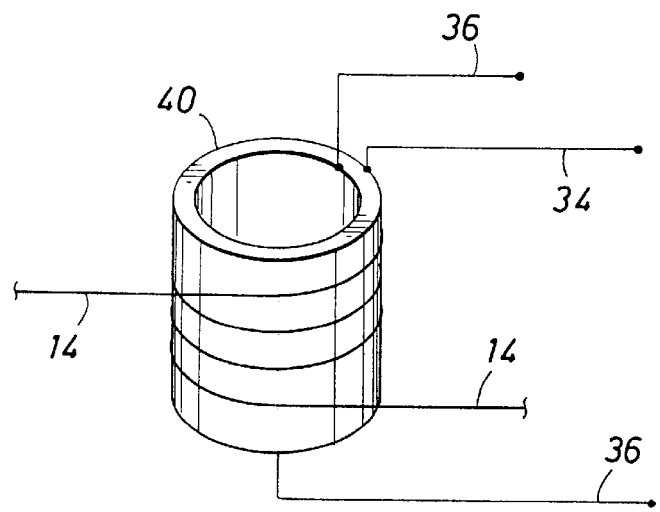

FIG. 2b depicts another embodiment of an electrical to optical transformer in accordance with this invention. In this case, a cylinder 40 is formed of the piezoelectric material. The lead 34 is coupled to an exterior surface of the cylinder 40, and the lead 36 is coupled to and interior surface of the cylinder 40, which develops a mechanical response when impressed with a time varying electrical signal from the leads. The transmission fiber 14 is wound around the cylinder 40, and the mechanical response from the time varying electrical signal thus varies the optical path length of the transmission fiber. This modulates the light signal in the transmission fiber, which modulation is detected in the central receiver.

Figure 2C:
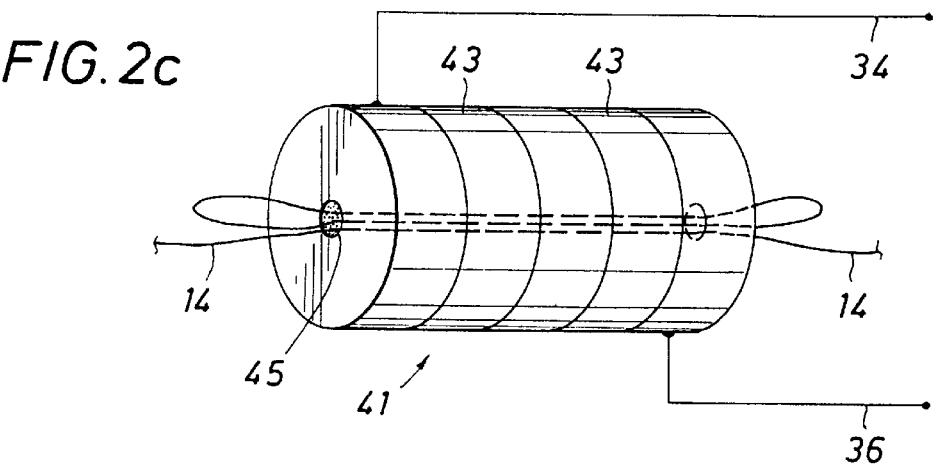

The embodiment of FIG. 2c is similar in function to the embodiment of FIG. 2b, except the leads 34 and 36 are coupled to opposite ends of a stack 41 of piezoelectric disks 43. The transmission fiber 14 is held longitudinally through the center of the stack 41, potted or otherwise secured in a longitudinal hole 45. Multiple longitudinal passes may be made to increase sensitivity, three of which are illustrated in FIG. 2c. Impression of an electrical signal from the leads 34 and 36 causes axial changes in length of the stack, which modulates the optical path length of the fiber 14.

Figure 2D:
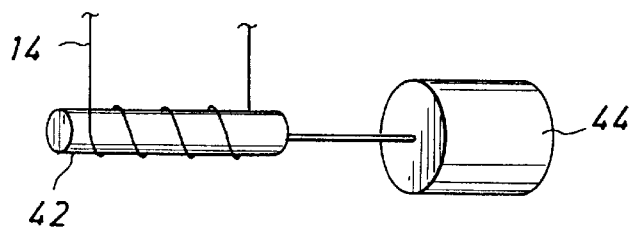

FIG. 2d depicts yet another preferred embodiment of the transformer. In this case, the transmission fiber 14 is wound around a compliant mandrel 42 which has a certain diameter in its rest state. The mandrel 42 is coupled to an electrodynamic element 44, such as a geophone. The electrodynamic element 44 develops a longitudinal compression of the compliant mandrel 42. This compression develops a change in the diameter of the mandrel 42, and this change in diameter is sensed as a change in the optical path length of the fiber 14.

FIGS. 3a and 3b depict another embodiment of this invention, which operates in a manner similar to the embodiment of FIG. 2c. This embodiment comprises a stack 50 of piezoelectric elements 52. Unlike the elements 43 of FIG. 2c, the piezoelectric elements 52 of solid disks. The stack 50 further includes an upper crown 54 and a lower crown 56. The crowns 54 and 56 are dome shaped, and may be truncated spheres, or truncated oblate spheroids. One important characteristic of the crowns is that they must present a curvature that is within the limits of curvature of the optical fiber 14. In the embodiment of FIGS. 3a nad 3b, the perimeter of the upper crown 54 meets flush with a top piezoelectric disk 58 and the perimeter of the lower crown 54 meets flush with a bottom piezoelectric disk 60.

In FIG. 3c, a top crown 62 has a perimeter that is greater than that of the stack 50, overhanging the stack by a lip 66 and a bottom crown 64 similarly describes a shelf 68. In the embodiment of FIG. 3a, the fiber 14 remains in contact with the crowns and the stack throughout the winding of the fiber around the stack, but in the embodiment of FIG. 3c the fiber 14 is in contact with the crowns 62 and 64, but does not contact the piezoelectric elements 52.

FIGS. 4a through 4c depict an embodiment of this invention in which a crown 70 and a crown 72 are bonded to either end of the stack 50, and each defines a truncated cylinder. The crowns 70 and 72 each provide a radius of curvature within the limits of the fiber 14, and provides a cylindrical surface on which to wind the fiber 14, rather than the spherical surface of the crown 54 and 56.

The common feature in each of the embodiments just described is the use of the electrical or mechanical signal from a conventional set of phones to develop a mechanical response which in turn varies the optical path length of an optical fiber as a modulation signal. Other structures may be developed building upon this common feature and such structures would fall within the scope of the appended claims.

The principles, preferred embodiments, and modes of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. An electrical to optical transformer comprising:
   a. a stack of piezoelectric disks, the stack describing a diameter;
   b. an upper crown on the top of the stack and a lower crown on the bottom of the stack each of the upper and lower crowns defining a smoothly curving convex surface;
   c. an optical fiber wound a plurality of times around the stack and the upper and lower crowns; and
   d. electrical input leads coupled to spaced apart disks of the stack.

2. The transformer of claim 1, wherein the upper and lower crowns each define a truncated sphere.

3. The transformer of claim 2, wherein each of the upper and lower crowns define a diameter which is greater than the diameter of the stack.

4. The transformer of claim 2, wherein the upper and lower crowns define a diameter which is the same as the diameter of the stack.

5. The transformer of claim 1, wherein the upper and lower crowns each define a truncated oblate spheroid.

6. The transformer of claim 5, wherein each of the upper and lower crowns define a diameter which is greater than the diameter of the stack.

7. The transformer of claim 5, wherein the upper and lower crowns define a diameter which is the same as the diameter of the stack.

8. The transformer of claim 1, wherein the upper and lower crowns each define a truncated cylinder.

9. A seismic sensor array comprising:
   a. a sensor string including a plurality of seismic sensors;
   b. an optical fiber; and
   c. a node coupling the string to the fiber for varying the optical path length of the fiber in response to a seismic signal detected by the sensors, wherein the node comprises a eletrical to optical transformer comprising:
      i. a stack of piezoelectric disks, the stack describing a diameter;
      ii. an upper crown on the top of the stack and a lower crown on the bottom of the stack;
      iii. an optical fiber wound a plurality of times around the stack and the upper and lower crowns; and
      iv. electrical input leads coupling the sensor string to spaced apart disks of the stack.

10. The array of claim 9, wherein the upper and lower crowns each define a truncated sphere.

11. The array of claim 10, wherein each of the upper and lower crowns define a diameter which is greater than the diameter of the stack.

12. The array of claim 10, wherein the upper and lower crowns define a diameter which is the same as the diameter of the stack.

13. The array of claim 9, wherein the upper and lower crowns each define a truncated oblate spheroid.

14. The array of claim 13, wherein each of the upper and lower crowns define a diameter which is greater than the diameter of the stack.

15. The array of claim 13, wherein the upper and lower crowns define a diameter which is the same as the diameter of the stack.

16. The array of claim 9, wherein the upper and lower crowns each define a truncated cylinder.

* * * * *